US012244766B1

(12) United States Patent
Rintz et al.

(10) Patent No.: US 12,244,766 B1
(45) Date of Patent: Mar. 4, 2025

(54) LIGHT SWITCH COVER HAVING ELECTRONIC COMMUNICATION SYSTEM

(71) Applicant: William J. Rintz, Hackettstown, NJ (US)

(72) Inventors: William J. Rintz, Hackettstown, NJ (US); Allen Wendell Moore, Hillsborough, NC (US); Christopher Ernst Bielenberg, Garner, NC (US); Russell Turner, Hillsborough, NC (US); Jesse Berkley Tucker, Youngsville, NC (US)

(73) Assignee: WILLIAM J. Rintz, Hacketstown, NJ (US)

( * ) Notice: Subject to any disclaimer, the term of this patent is extended or adjusted under 35 U.S.C. 154(b) by 0 days.

(21) Appl. No.: 18/791,982

(22) Filed: Aug. 1, 2024

Related U.S. Application Data

(60) Provisional application No. 63/556,303, filed on Feb. 21, 2024.

(51) Int. Cl.
*H04M 3/51* (2006.01)
*H01H 23/02* (2006.01)
*H01H 23/04* (2006.01)
*H04M 1/03* (2006.01)

(52) U.S. Cl.
CPC ........ *H04M 3/5116* (2013.01); *H01H 23/025* (2013.01); *H01H 23/04* (2013.01); *H04M 1/03* (2013.01); *H04M 2201/38* (2013.01); *H04M 2201/42* (2013.01); *H04M 2203/1033* (2013.01)

(58) Field of Classification Search
CPC .... H04M 3/5446; H04M 1/03; H04M 3/5116; H01H 23/025; H01H 23/04

USPC ...................................................... 379/37–52
See application file for complete search history.

(56) References Cited

U.S. PATENT DOCUMENTS 7,273,983 B1 * 9/2007 Rintz ..................... F21S 8/035
        174/67
2003/0012344 A1 * 1/2003 Agarwal .............. H04M 11/045
        379/37

* cited by examiner

*Primary Examiner* — Maria El-Zoobi
(74) *Attorney, Agent, or Firm* — DANIEL S. POLLEY, P.A.

(57) ABSTRACT

A combination light switch cover/communicator device that can serve as both an easy-to retrofit single- or dual-gang light switch cover and an emergency safety device. The cover communicator can be designed to install in similar process to a conventional light switch cover, while also preferably containing a remote monitor and lockdown switch, which can also provide for emergency activated video monitoring availability. A preferably provided lock-down button can be used to minimize the time it takes to contact first responders or to lock down a building. Where provided, live video of an emergency/event can be recorded and preferably upon activation can be provided or remotely forwarded to provide police and other first responders with current information concerning the emergency/event. The communicator portion provides for monitoring and can digitally transmit critical information to others who may be remotely located and can also provide critical information to individuals involved with the event through audio, hi-resolution LCD screen and/or multi-character text display. The communicator also can provide location information in real-time, to help first responders to arrive faster to the event.

19 Claims, 12 Drawing Sheets

LIGHT SWITCH COVER HAVING ELECTRONIC COMMUNICATION SYSTEM

This application claims the benefit of and priority to U.S. Application Ser. No. 63/556,303, filed on Feb. 21, 2024, which application is incorporated by reference in its entirety for all purposes.

FIELD OF THE DISCLOSURE

The disclosure relates generally to the unrelated and independent fields of light switch covers and electronic communication devices/system and more specifically describes herein a novel product having attributes for use in both unrelated independent fields.

BACKGROUND

Since the inception of the light switch for controlling electricity, the use of light switch covers has been integral to mitigate the risk of electrical shock. Over time, light switch covers have evolved from mere safety mechanisms to encompass decorative elements. The novel light switch cover disclosed herein further improves on the function and design of light switch covers,

SUMMARY OF THE DISCLOSURE

A novel light switch cover/communicator device (hereinafter sometimes collectively referred to as just "cover" in this disclosure) is disclosed. In one non-limiting embodiment, the novel cover can be a retrofit assembly and can be directly wired into existing light switches and can provide for instantaneous alerts to occupants and authorities through preferably custom-coded voice prompts or by activating a preferably provided 'Lockdown' button. The disclosed novel light switch cover communicator can be programmed to designate a specific location and thus can help to facilitate precise or virtually precise electronic mapping of buildings or facilities. This feature can help to enhance and improve emergency response capabilities and situational awareness.

The novel cover can provide critical response graphic mapping akin to a blueprint, such that the novel cover communicator can electronically pinpoint its location within a structure. Furthermore, the novel cover can preferably be an Internet of Things ("Iot") device and can preferably seamlessly integrate with open-source emergency response systems, bolstering the utility of the novel cover in various contexts.

The novel cover can provide for an easy-to-retrofit single or dual-gang light switch cover and emergency safety device preferably designed for installation similar to a standard light switch cover, while also preferably providing and containing one or more of the following: (1) remote monitor and lockdown switch capabilities, (2) emergency-activated video monitoring availability; and (3) intercom features for local two-way communications. In a preferred embodiment, at the press of a button, by remote actuation by another electronic device (e.g. such as, without limitation, a remote incident communicator as shown and described in my application, U.S. application Ser. No. 18/241,345, filed Sep. 1, 2023, entitled REMOTE ACTUATOR INCIDENT COMMUNICATOR FOR EMERGENCY NOTIFICATION SYSTEMS, which is incorporated by reference in its entirety) or by a coded voice command, users are able to virtually instantly notify the system of an emergency or other event.

The novel cover can act as a "panic" button that can virtually immediately notify the monitor to call for help (e.g. admins can program individual codes for emergencies to help avoid or reduce false positives. The novel cover can "push" notify 911 or other emergency agencies/personal that an emergency has occurred and can continuously provide the exact device location through critical response group critical incident mapping information. The novel cover can also provide graphic and text feedback about the current emergency status.

After initial actuation, the disclosed novel cover can live-stream audio and/or video within its range of coverage at the location of the emergency/event and can also provide location information in real time for first responders and other individuals, enabling and allowing them to coordinate highly effective potentially life-saving rescues and responses. The novel cover can also be provided with an emergency lockdown lever that when activated can initiate preferably preconfigured/predetermined site-specific lockdown protocols.

The novel cover can be easily retrofitted into the area where a conventional light switch is typically located (i.e. on a wall, ceiling, floor, etc.) by using existing switches to power and mount the device/cover and, thus, saving on potential new wiring costs. The novel cover can also be used with ceiling smoke/carbon monoxide type detectors (and/or existing wiring therefore), as well as wall and ceiling plugs/outlets (and/or existing wiring therefore) Accordingly, the definition of Cover or light switch cover is also considered to include wall plug and USB outlet/ports covers and the existing outlets/ports can be accessible similar to how existing the existing light switches are described and shown herein. The cover can be provided with a battery back-up which preferably, but not limiting, can last up to 24 hours in case of power outages. The novel cover can immediately or virtually immediately notify 911 or other emergency centers/agencies, as well as any existing internal security/safety communications apparatus of the building, campus, location, school, facility, etc. to report an emergency. The novel cover can provide critical response group critical incident mapping information to first responders. The novel cover can preferably have WiFi and/or cellular capabilities, though such is not considered limiting, and the novel cover can work with other communication technologies now known or later developed. The outer appearance of the novel cover can be wrapped in customed designs, such as, but not limited to, organization or school colors or logos, other colors or color patterns, various images, etc.

Though not considered limiting, the novel cover can effectively be used in schools, government buildings, jails, prisons, correctional facilities, businesses and business offices, college campuses, medical facilities and/or commercial/retail facilities. Preferably the novel cover can be used anywhere a standard single- or higher-number-gang light switch may be installed.

The provided lockdown button for the novel cover can minimize the time needed to contact first responders or to lock down a building/campus in an emergency. Activating the lockdown (i.e., pushing or pulling the lockdown button depending on configuration) can automatically cause certain contact and lockdown procedures to be initiated. The novel cover can also provide a live video feed that can be used to record events and inform police/first responders upon activation. The novel cover can provide for communications monitoring to provide critical information related to active situations preferably through light emitting diodes (LEDs), audio, hi-res LCD screen and/or multi-character display. The novel cover can also provide location information using Critical Response Group, Critical Incident Mapping or the like which can help first responders get to users and victims faster.

The novel cover can be considered a self-contained emergency response activator that can connect directly to first responders. The novel cover can be provided with prerecorded and/or live video feeds and in one embodiment can provide up to 4K video, though such is not considered limiting. The cover can be provided with memory and in one non-limiting embodiment can be provided with up to 42 GB of memory. The novel cover can provide for live or prerecorded A/V recording and can include in one non-limiting embodiment up to 10 hours of non-stop A/V or other sensor data recording. The novel cover can be provided with a wide-angle lens and in one non-limiting embodiment the lens can be a 140-degree wide angle lens (though other higher or lower degree values can be used and considered within the scope of the disclosure). The novel cover can be provided with one-touch recording and can have built-in wired communication, or wireless communication such as Cellular, 802.11WiFi and/or Z WAVE and the like. The novel cover can include built-in geoautonomous control and/or other items that may not involve communication. As a non-limiting example, a machine learning/vision recognition system could be provided for automatically detecting weapons, fire/smoke, too many people in a room and/or automatically initially/activating an emergency event situation (i.e. without a user having to activate a button or lever or communicate with another system or individual), as well as tagging stamps to provide date, time and GPS coordinates for every event.

The novel cover can be provided with a battery-life indicator. The provided battery/battery back-up can be a rechargeable battery such that the battery can be recharged while electrically connected and secured to the existing light switch circuitry/wiring. The novel cover can be provided with a built-in audio devices such as buzzers or speakers. The novel cover can provide for haptic confirmation and a low back-up battery alert. The novel cover can be configured for simultaneous photo-taking while recording video. The novel cover can be provided with built-in night vision and can also have a built-in flashlight, such as, but not limited to an LED flashlight. The novel cover can also be password protected to prevent or reduce hacking and other unauthorized access. The novel cover may be ruggedized as necessary to prevent or reduce damage in environments where it is likely to be damaged.

In addition to powering the novel communication system, the preferred in wall A/C power can also be used to charge a provided battery back-up that can preferably provide for 24-hour battery life, though such time period is not considered limiting. Thus, the A/C in-wall charger can charger an internal back-up battery that can provide full or functionality for the novel cover/communicator while the main A/C power is out.

The novel cover can automatically establish communications with first responders preferably with a single button press, alarm pull, or spoken keyword or the like, and can have wired or wireless 802.11 WiFi and/or 4G/5G connectivity or the like.

The novel light switch cover/communicator can provide one or more, and preferably all of the non-limiting advantages, benefits and/or features:

a. Acts as a light switch cover for existing light switches, preferably in lieu of or in replacement of any preexisting light switch cover;

b. Can be provided with electronics and configured to allow it to act as a voice-activated incident communicator for various emergencies;

c. Can be provided with electronics and configured to allow it to act as an intercom for two-way communication between a main office and classrooms, rooms or other offices within any building;

d. Can be provided with electronics and configured to act as a lockdown actuator for school or campus emergencies;

e. Can be provided with electronics and configured/programmed to provide exact or virtually exact location information within any building for aiding in a quicker response time for emergencies;

f. Can be provided with electronics and equipped with a digital display screen for important alerts, emergency instructions, general communications and custom graphics/images;

g. Can be provided with electronics and configured/programmed to be seamlessly integrated within any other open-source emergency response system or closed source system with the appropriate software applications interfaces exposed;

h. Can be provided with electronics and configured/programmed to allow it to be controlled remotely by another electronic device, such as, but not limited to, a Remote Incident Communicator mobile device, such as my above noted Remote Incident Communicator;

i. Can be provided with electronics and configured to be powered off existing electrical connections inside a standard single, double or triple gang electrical box (though the number of gangs for the box are not considered limited to any specific number);

j. Can be designed for mounting or placement anywhere inside a building without an electrical box, with the electronics being powered using a Cat5 Power over Ethernet POE connection (or battery powered). A battery can also be provided for use as a backup in situations or scenarios where there are power failures or power loss;

k. Can be equipped with or without a camera; and l. Can be provided with a battery backup for power failures.

Accordingly, in addition to serving as a light switch cover, the novel light switch cover/electronic communicator disclosed herein can also be used as a communication mechanism/emergency communicator in normal and/or during emergency scenarios/events. Though reference herein as a communicator, the wording communicator is also considered to include autonomous control or other technologies that may not necessarily involve communication in order for actions to be taken, such as, but not limited to, use of machine learning/vision recognition systems automatically detecting weapons, fire/smoke, too many people in a room, etc.

BRIEF DESCRIPTION OF THE DRAWINGS

The figure shows a non-limiting embodiment for the novel light switch cover in accordance with the present disclosure.

DETAILED DESCRIPTION

Figure 1:
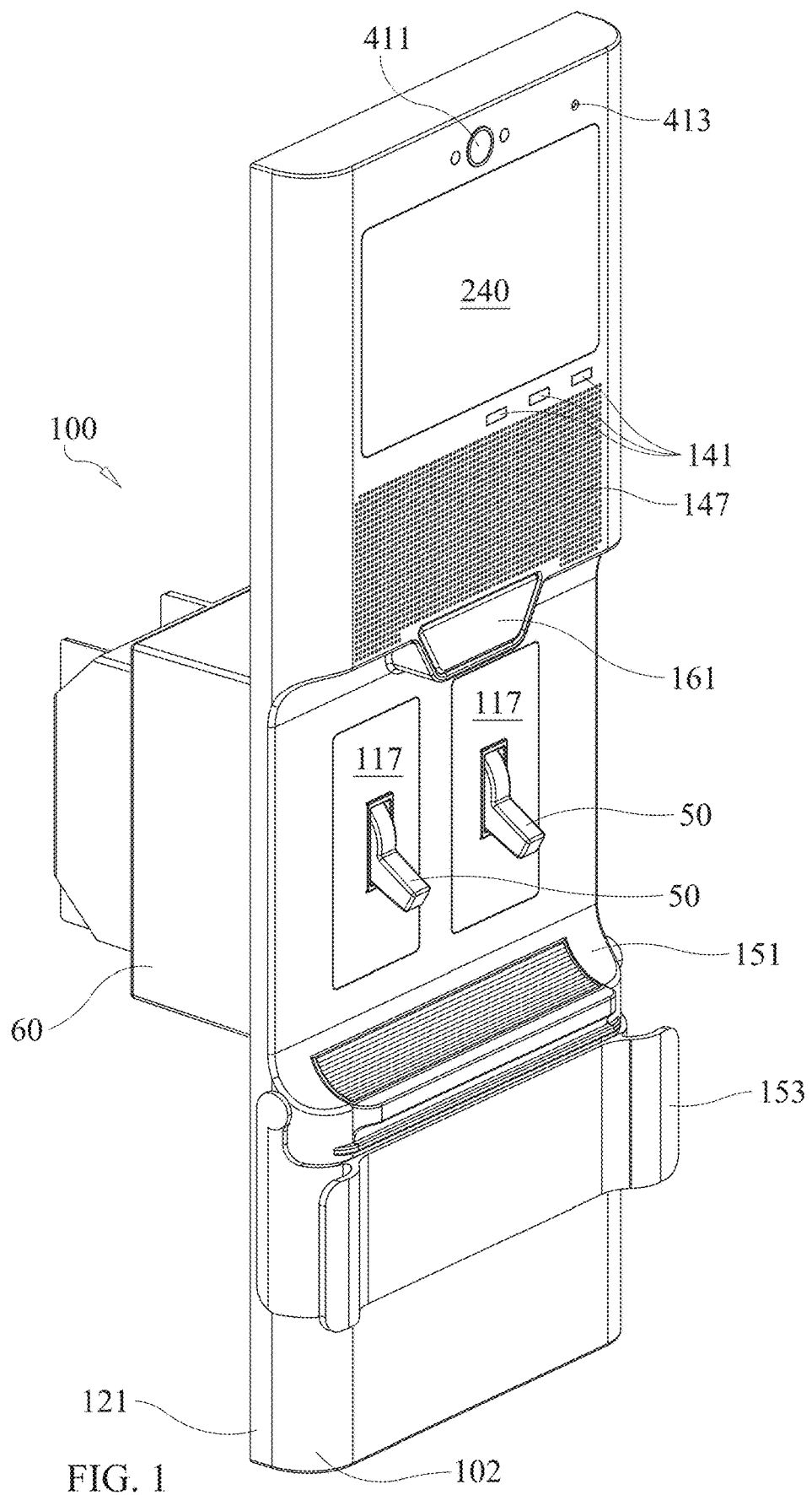
FIG. 1 is a front perspective view of a non-limiting embodiment combination light switch cover/electronic communicator secured to a double gang electrical in accordance with the present disclosure.
Figure 2:
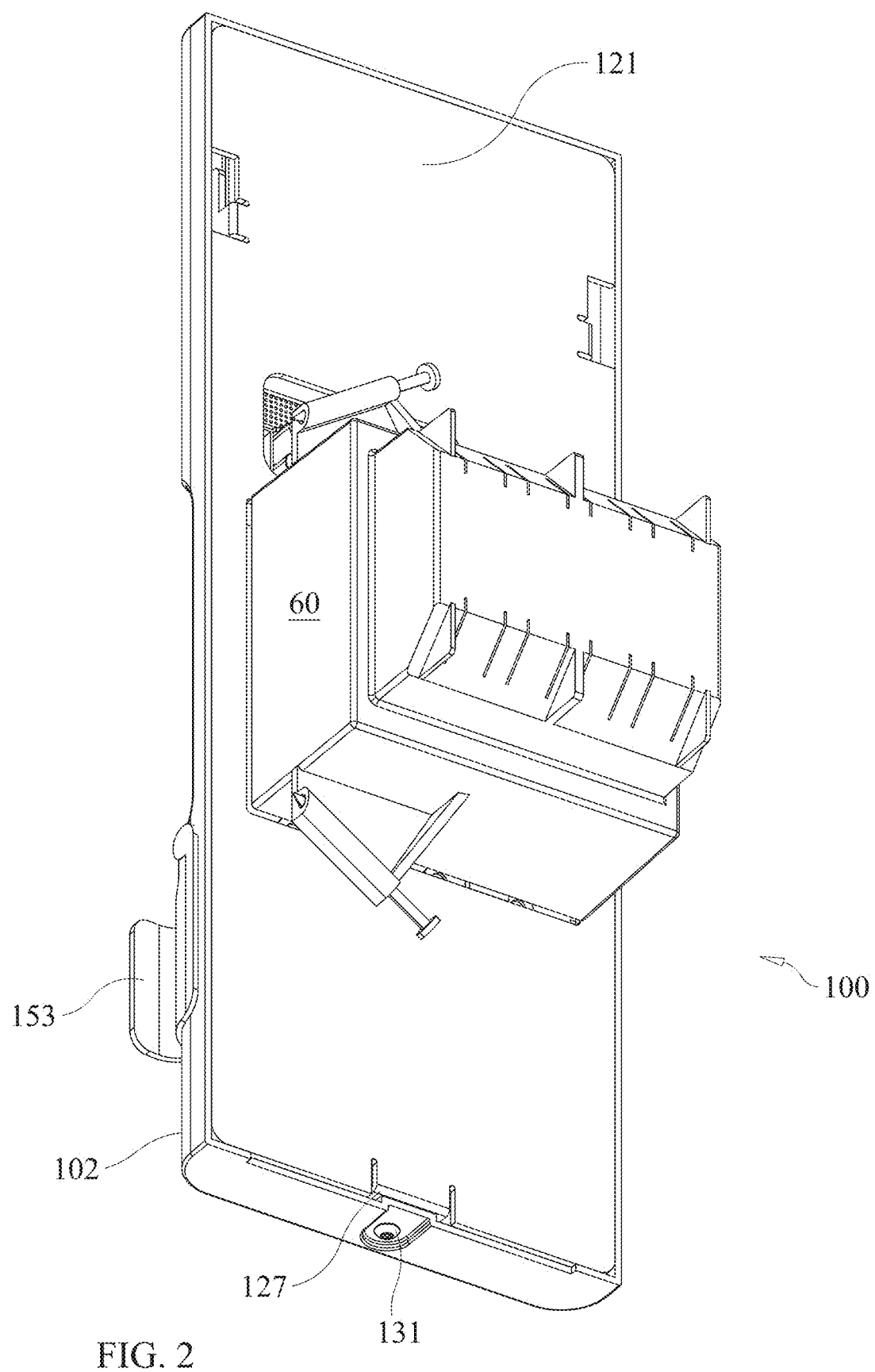
FIG. 2 is a back perspective view for the combination light switch cover/electronic communicator of FIG. 1.
Figure 3:
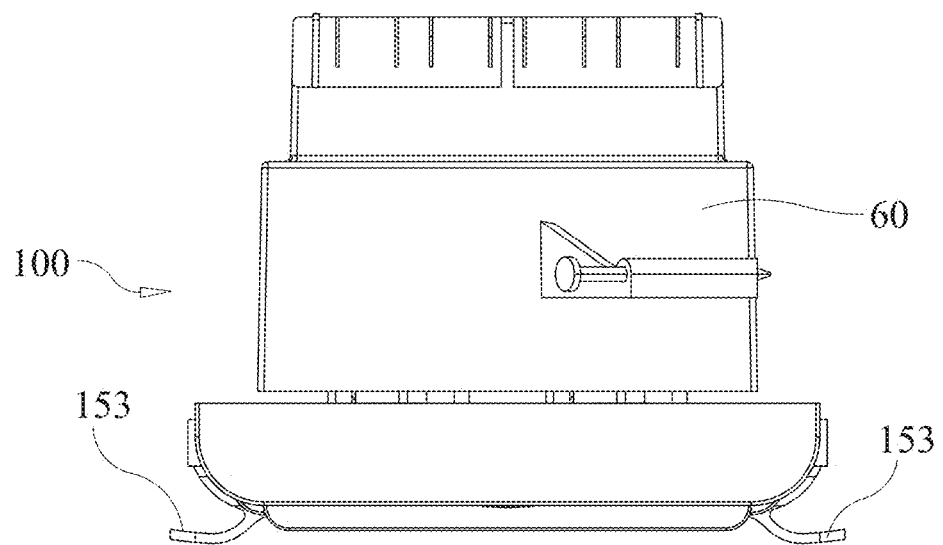
FIG. 3 is a top view for the combination light switch cover/electronic communicator of FIG. 1.
Figure 4:
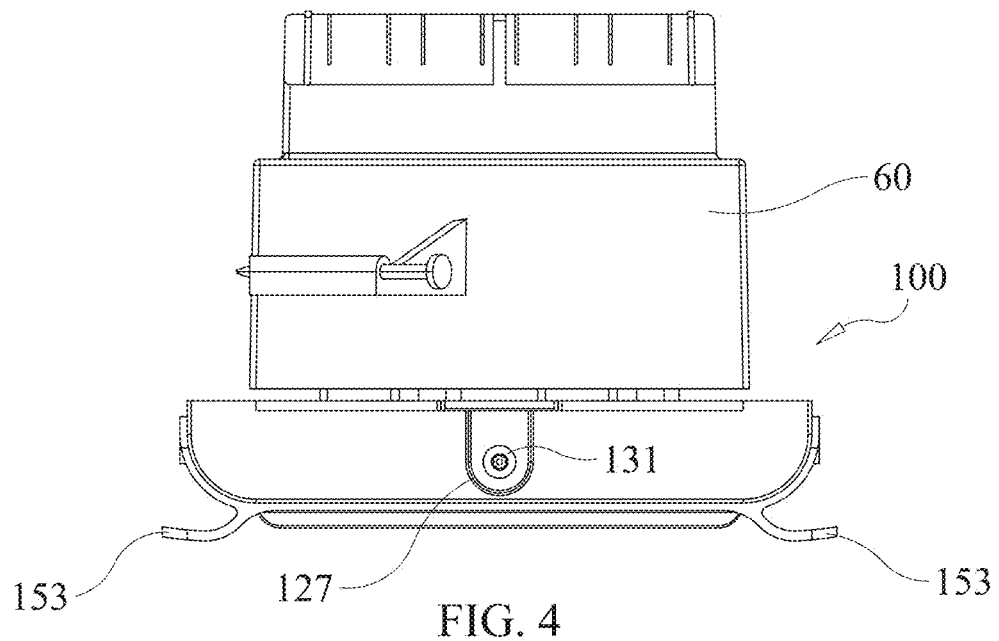
FIG. 4 is a bottom view for the combination light switch cover/electronic communicator of FIG. 1.
Figure 5:
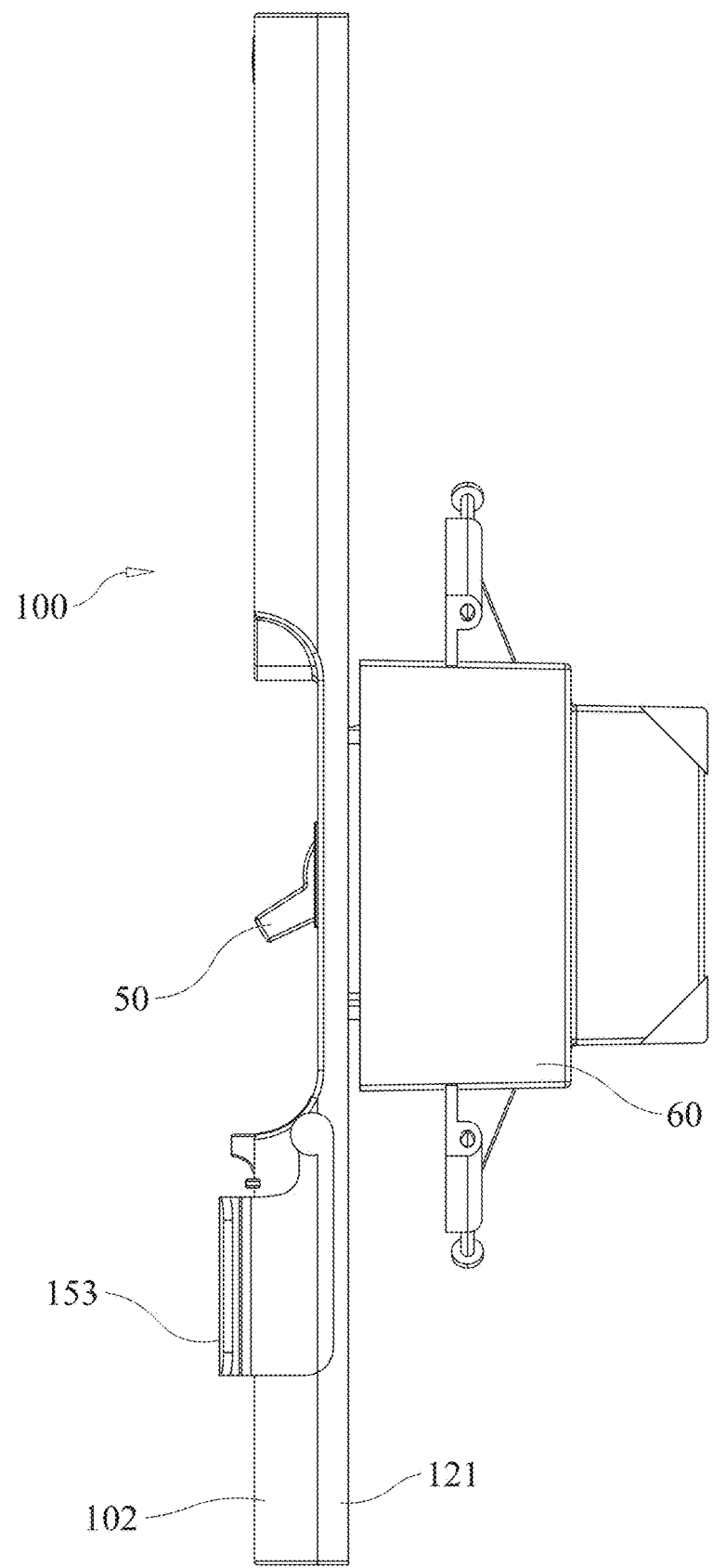
FIG. 5 is a side view for the combination light switch cover/electronic communicator of FIG. 1.

A novel combination light switch cover and communication system (collectively throughout "Cover") is shown in the drawings and generally designated as Cover 100. A light switch cover portion 120 can be provided for similar use in covering an existing electrical box 60 and allowing the existing light switches 50 to protrude through openings 122 the cover portion 120 for conventional access and use of existing light switches 50. Preferably, Cover 100 can provide for a voice-activated communicator/incident communicator for various emergencies and can trigger/initiate other actions for the emergency event (i.e. room lockdown, building lockdown, etc.). Cover 100 can also serve as an intercom for two-way communication between a main office and classrooms or other offices/rooms within any building during normal conditions and/or emergency conditions.

When used in connection with a school or campus, Cover 100 can act as a lockdown actuator 151 (i.e. pull down lever, push button, etc.) for emergencies situations occurring at the school or campus location. A microcontroller 320 or similar programmable device/component of the communication system can be programmed with an exact location within any building to aid in a quicker response time to a specific location for the emergency within a multiple room/office building. The communication system can be provided with a digital display screen/touchscreen 240 which can provide for important alerts and information during an emergency situation and/or general communications and/or custom graphics (such as during non-emergency situation).

Figure 6:
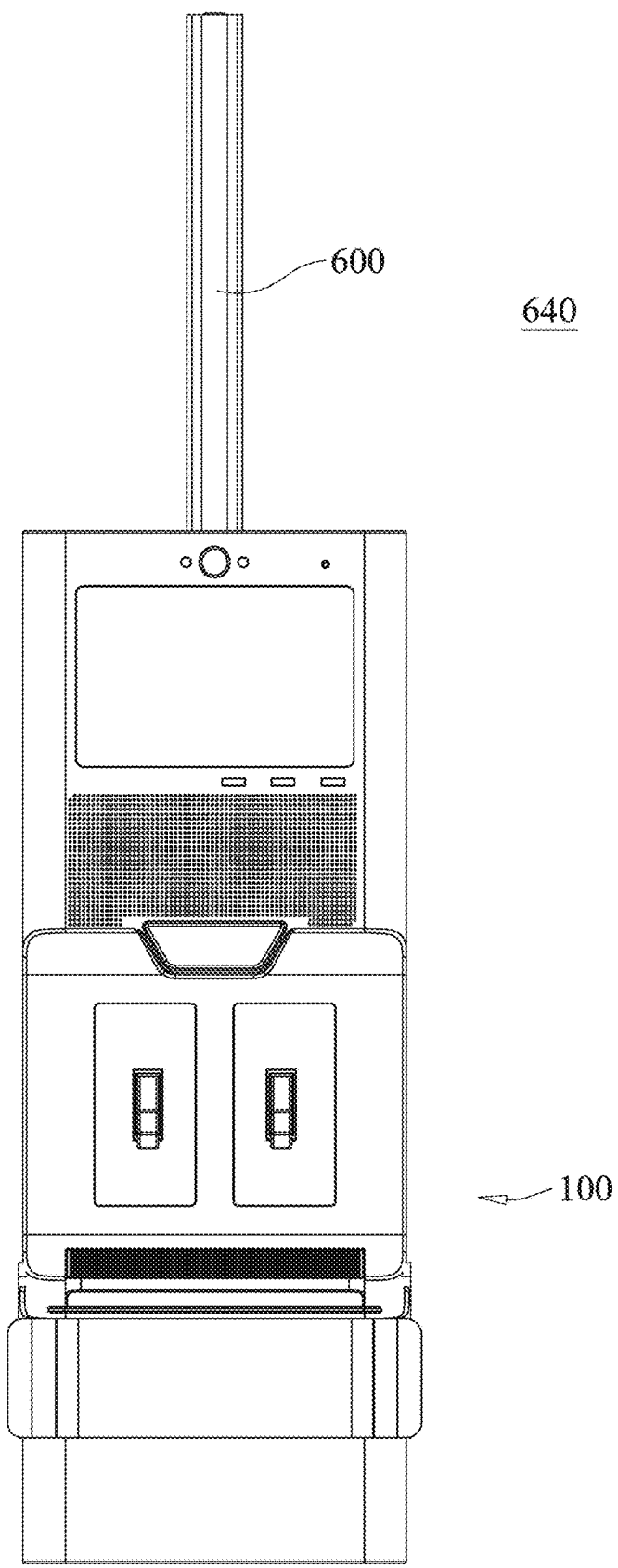
FIG. 6 is a front view of the combination light switch cover/electronic communicator of FIG. 1 electronically connected with a CAT 5 line/cable (collectively "line") for primary or alternative communication, transmission and/or power capabilities, such as Power of Ethernet ("POE")
Figure 7:
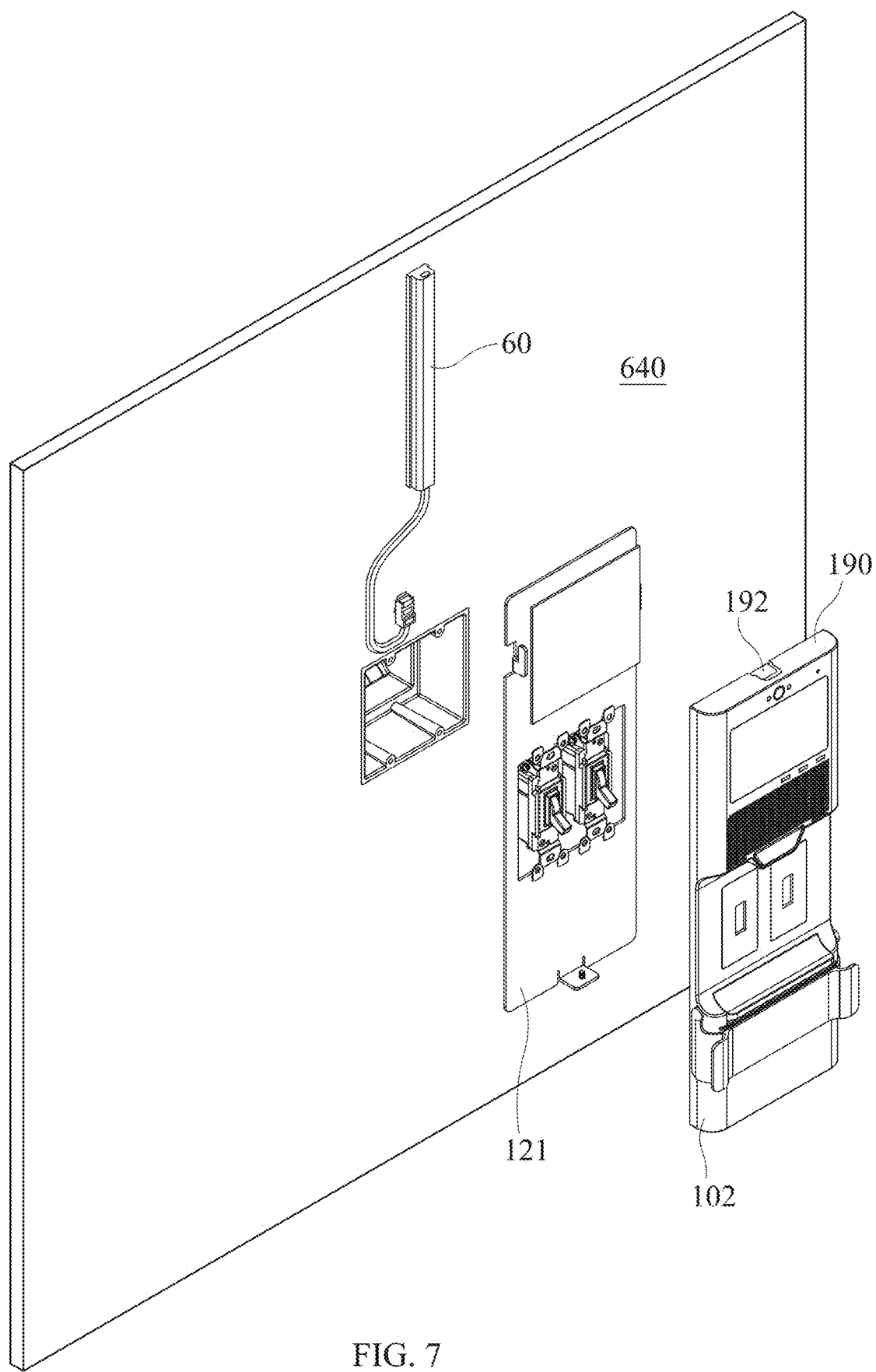
FIG. 7 is an exploded top perspective view of the cover/communicator with CAT 5 line for POE of FIG. 6.
Figure 8:
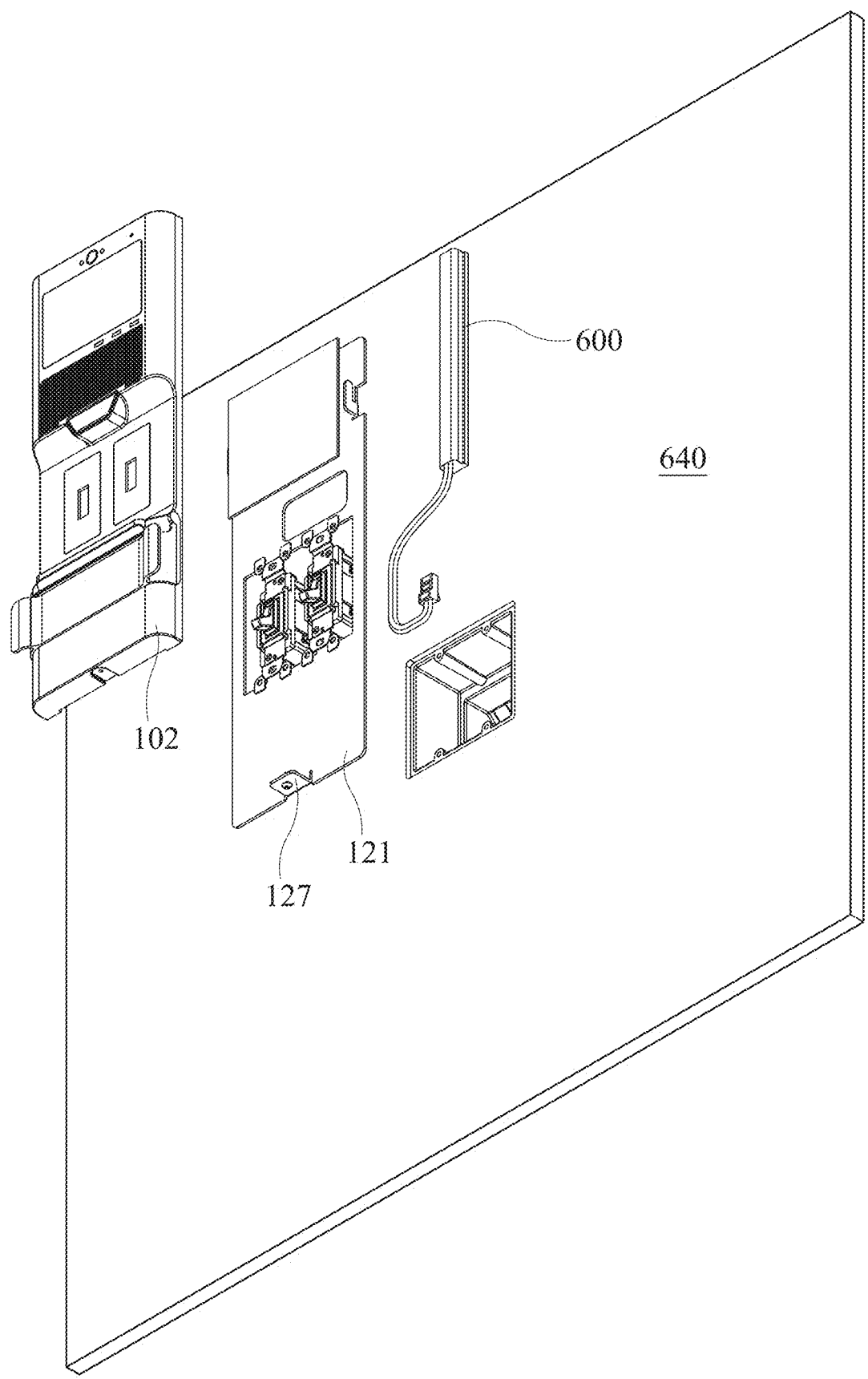
FIG. 8 is an exploded bottom perspective view of the cover/communicator with CAT 5 line for POE of FIG. 6.

The electronics of the communication system of Cover 100 can be seamlessly integrated within and/or in electronic/digital communication with any other open-source emergency response system. Cover 100 can also be controlled remotely by other communication devices, such as the above-noted Remote Incident Actuator Communicator mobile device. Preferably, while mounted to an existing electrical box within a room/office, etc., Cover 100 can be powered by existing electrical connections inside a standard single, double or triple gang electrical box 60.

Where no electrical box 60 exist or another location for Cover 100 is preferred or desired, Cover 100 can be mounted and/or secured and placed anywhere inside a building, preferably, though not-limiting, through the use of a Cat5 Power over Ethernet POE connection 410 (See FIG. 6, FIG. 7 and FIG. 8). Preferably, Cover 100 using Cat5 Power over Ethernet POE connection 410 can operate the same or highly similar to Cover 100 mounted to electrical box 60, such that the above and below description of components and operation for Cover 100 mounted to electrical box 60 should also be considered to cover the components and operation of Cover 100 when using Cat5 Power and the electrical box 60 description is incorporated by reference for FIG. 6, FIG. 7 and FIG. 8.

As best seen in FIGS. 1-5 and FIG. 12 a first non-limiting embodiment for Cover 100 can be provided and can be preferably mounted to an electrical/standard gang box 60. Though the drawing show two light switches 50 and a standard 2-gang box 60, such is number of switches is solely for example purposes and the features/functions of Cover 100 can be used with any number of switches 50 and corresponding electrical/gang box 60 and all are considered within the scope of the disclosure.

Cover 100 provides for an easy-to-retrofit gang light switch cover/emergency safety device which can be preferably designed to install similar to how a standard light switch cover is secured to box 60, with Cover 100 also providing for remote monitoring of the room where Cover 100 is mounted and providing for a lockdown switch capabilities (i.e. emergency-activated video monitoring available), and can be provided with an intercom feature for local two-way communications. Accordingly, at the press of an emergency button 138 or via remote actuation from another communication device or through voice commands recognized by microcontroller 320, users are able to instantly notify the system of an emergency.

After initial actuation, Cover 100 can livestream audio and/or video while also providing advanced Critical Response Group ["CRG"] Critical Incident Mapping ["CIM"] information for first responders including exact location of Cover 100 within the building. Cover 100 can be provided with an Emergency Lockdown Lever 151 that when activated can cause microcontroller 320 to initiate site-specific lockdown protocols. Thus, in addition to serving as a light switch cover, Cover 100 can act as a 'panic button' that can immediately or virtually immediately notify a monitoring person to call for help. (note: admins can easily program individual codes for emergencies to avoid false positives). The communicator portion of Cover 100 can be used to push-notify 911 or similar emergency agency that an emergency has occurred and can continuously provide the emergency agency/organization and first responders with the exact device location via the CRG CIM information. Additionally, Cover 100 can provide graphic and text feedback about the current emergency status, can be relatively easily retrofitted by using existing switches to power and mount Cover 100 and thus saving on potential new wiring costs Cover 100 can include a battery back-up 193 which in one non-limiting embodiment can last up to 24 hours in case of power outages. Other longer lasting and shorter lasting batteries can also be used and are considered within the scope of the invention.

Wireless communication for Cover 100 can be accomplished through WiFi and/or cellular embodiments and Cover 100 can also be equipped for wired communication while in a mounted configuration.

When not in an emergency situation, screen 240 can display logos, colors, designs, artwork, images, etc. Though not considered limiting, Cover 100 can be preferably used in schools, government buildings, jails, prisons, correctional facilities, business and college campuses, medical facilities and commercial/retail facilities, and preferably can be provide anywhere a ganged light switch may be installed, including standard single- or dual-gang light switches.

The provided lockdown button/lever 151 when pressed/pulled helps to minimize the time needed for contacting first responders and/or to lock down the building/campus where Cover 100 is located in the event of an emergency. Cover 100 can provide to remotely located first responders and/or others a live video of the emergency as it is happening in the room where Cover 100 is located and can be used to record events and inform first responders upon activation (i.e. pressing or pulling lockdown button/lever 151). Cover 100 can provide information to and from an individual in the room where Cover 100 is located related to active situations via its provided audio, hi-res LCD screen and/or multi-character text display 240. Messages and information can include, without limitation, messages sent by first responders and/or emergency organizations. As noted above, Cover 100 can also provide location information using CRG CIM in order to help first responders and/or other individuals get to the scene of the emergency faster.

The below discussion uses a 2-gang light switch/electrical box for describing the installation and operation of Cover 100 for discussion purposes only. As noted above, Cover 100 can be designed to work with various number or styles of gang light switch/electrical boxes and all are considered within the scope of the disclosure. Preferably, Cover 100 can be installed in place of an existing 2 gang light switch cover. Preferably a front member 102 can be provided with light switch openings 103 for receipt of the existing light switches 50 and a back member 121 having a switch opening 123 and attachment screw openings 125. Switch 50 can be provided with attachment screw openings 51 and electrical box 60 can be provided with female receiving portions 61 that receive the attachment screws. When Cover 100 is assembled back screw openings 125 are aligned with light switch openings 51 that are disposed in front of back screw openings 125. With the various screw openings aligned, and the electrical wiring from box 60 secured to the light switches, attachment screws can be fed through the aligned openings and received within the female receiving portions 61 (which can be a threaded connection) to mount back member 121 and light switch 50 with respect to the box 60 of the wall or other surface. Front member 102 can then be snap or clip connected, or other known fastening mechanism, to back member 121 causing light switch 50 to extend through openings 103 in the front for the user to use light switches 50 as normally used, while the back of light switches continue to extend through opening 123 in back member.

Accordingly, Cover 100 can be mounted/held in place preferably by capturing it between the 2-gang electrical box and light switches utilizing the existing hardware and mounting locations for the light switches. Standard or decorative switch cover adaptors 117 can also be provided and positioned over light switches 50 and can be seen through light switch openings 103 of front member 102.

Figure 11:
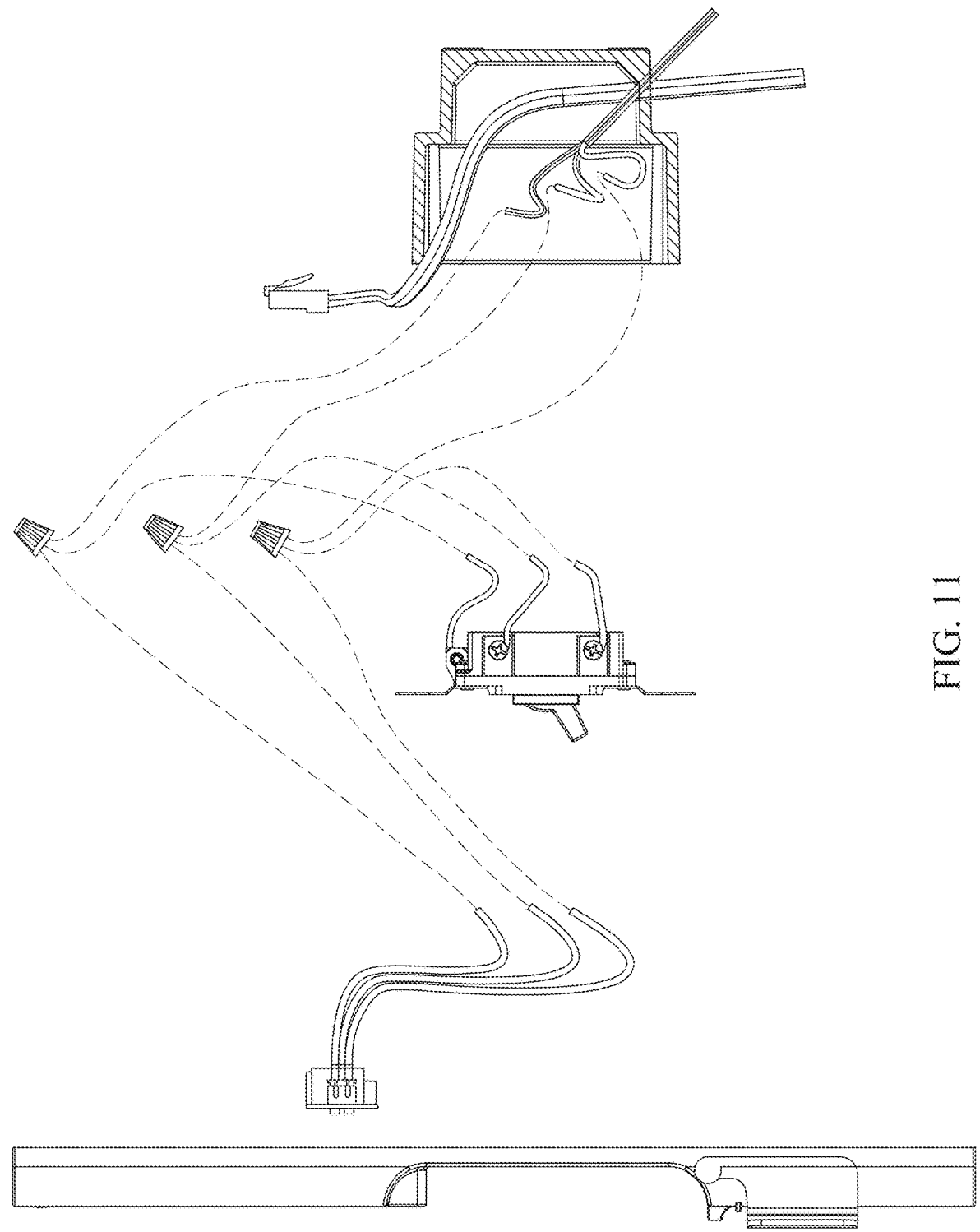
FIG. 11 is an exploded view illustrating a non-limiting embodiment for splitting power from an existing wall power to a single light switch in a dual gang box to power the Cover in accordance with the present disclosure (though it is also noted that lighting can be controlled with using switches where the system turns lights on/off with user inputs and such use should also be considered within the scope of the disclosure)
Figure 12:
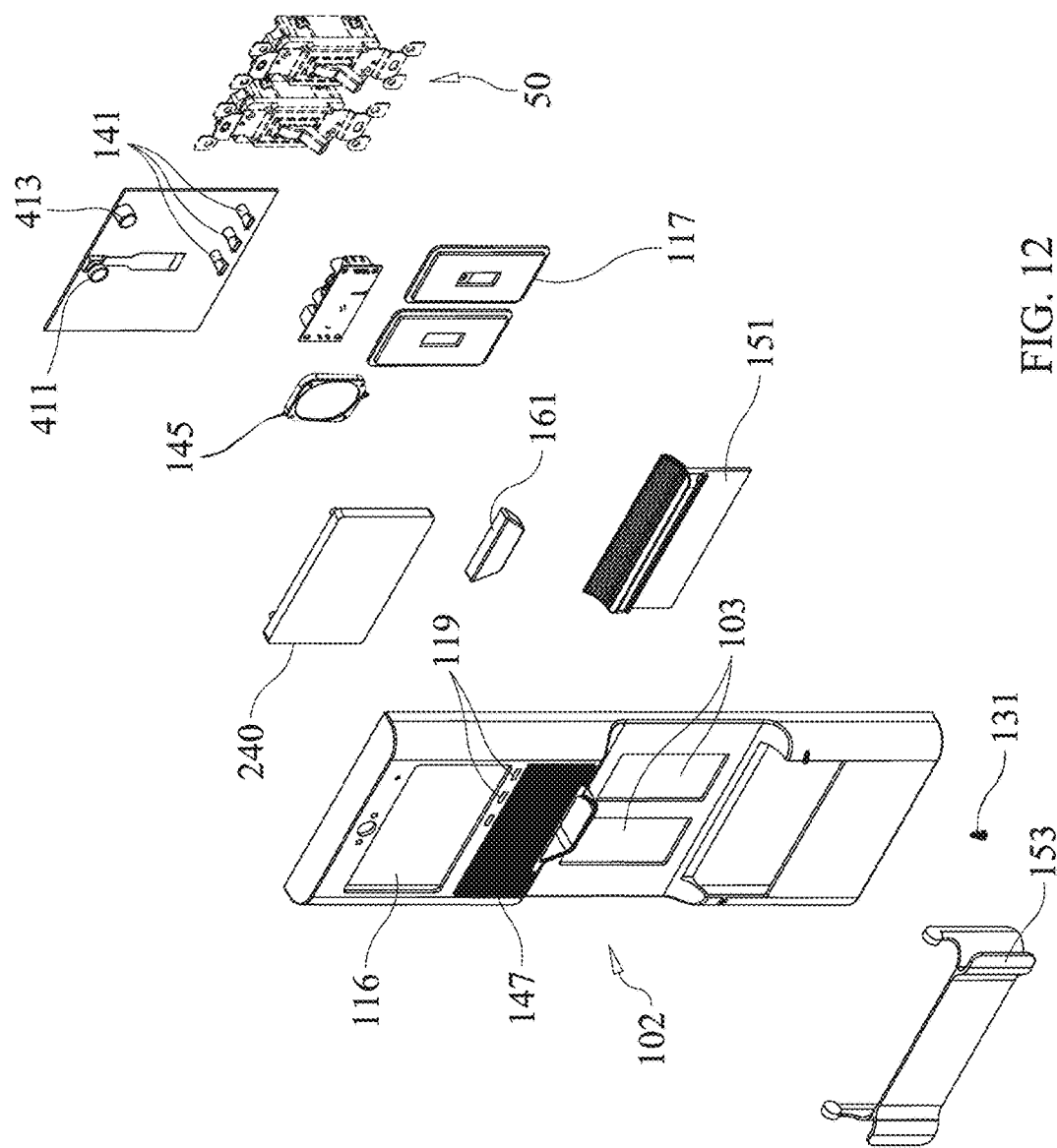
FIG. 12 is an exploded view showing various components comprising the cover/communicator of FIG. 1.
Figure 13:
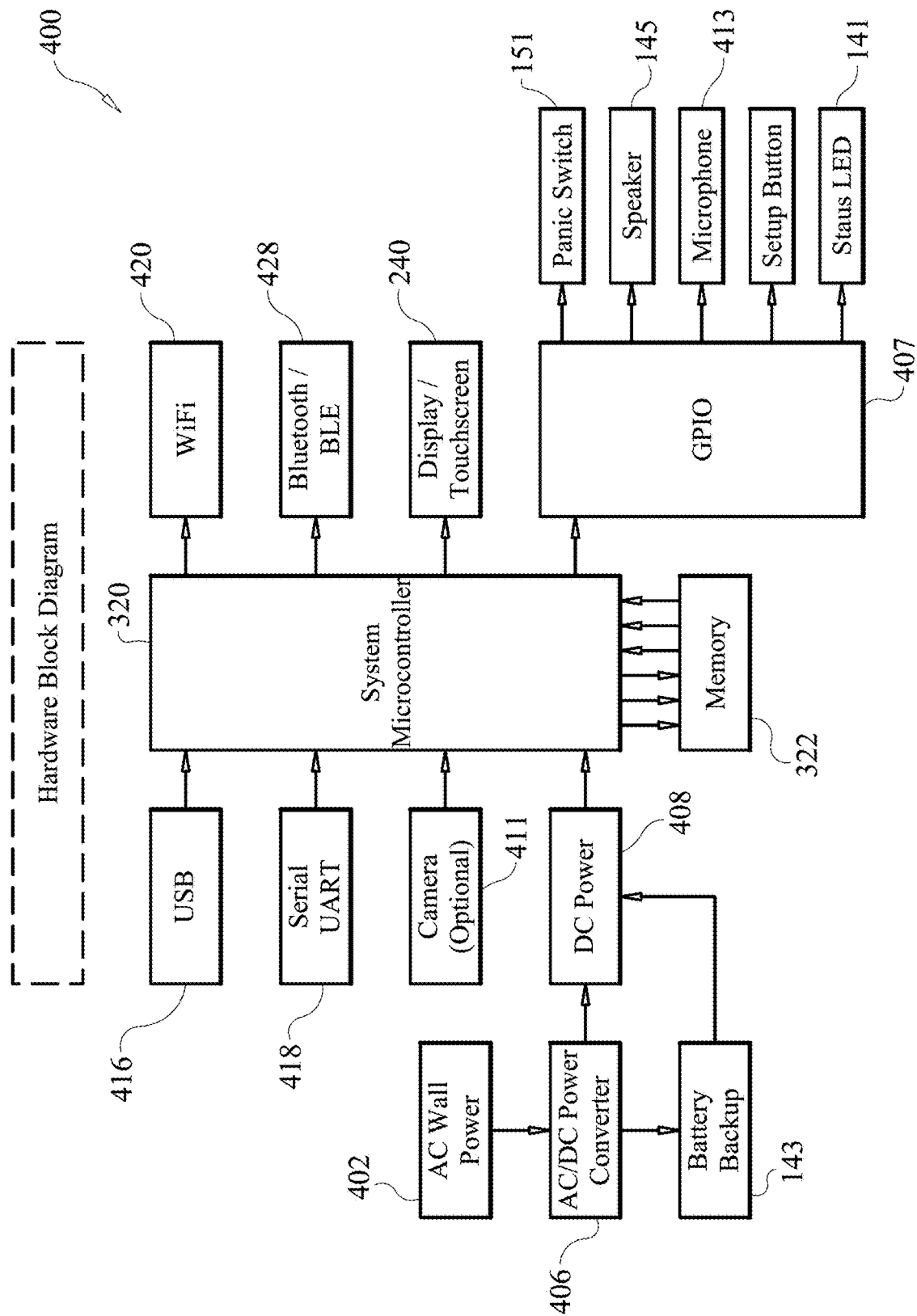
FIG. 13 is a hardware block diagram showing one non-limiting embodiment for the preferred electronics for the cover/communicator in accordance with the present disclosure.

As best seen in FIG. 11, a splitter can be provided to draw power from an existing line voltage from a single light switch to distribute 120V power to the electronic/electrical components of Cover 100. The splitter can be reconnected to light switch 50 and the free ends of the splitter can be connected to Cover 100, feeding power through an AC/DC converter 406 to convert the power to DC power 408 for supplying power to the hardware/electrical components of Cover plate, such as those seen, and discussed further below, for hardware schematic 400 (FIG. 13).

With the Cover 100 mounted to the wall/surface, Cover 100 can be further fixed in place using tamper resistant screw 131 at the base/bottom of front member 102 and back member 121 (i.e. see screw receiving aperture 127 (preferably threaded) of back member 121. Though not seen in FIG. 12, a similar bottom aperture can be provided with front member 102 and would be aligned with aperture 127 for receipt of tamper resistant screw 131.

When setting up Cover 100 for operation (i.e. operation beyond being a light switch cover), the electronics of Cover 100 can begin to boot up upon receiving power from the existing line voltage. Once complete, a unique location code can be assigned for Cover 100 which can preferably correspond with a predefined location map of the facility/building where Cover 100 is mounted/located. Alternatively, Cover 100 may begin to transmit some unique identifying code or serial number that the location mapping system uses to indicate the new installation's position. The location map can be a blueprint layout of the facility/building that can depict the location of Cover 100 located in the building/facility and the assigned location code for each Cover 100. Accordingly, each Cover 100 can act as a reference point within the facility/building. Preferably, a Wi-Fi or Bluetooth connection or the like can be established with a wireless network for the system associated with Cover 100. Additional settings and preferences can be established remotely based on the requirements of the receiving organization.

When Cover 100 is in a standby mode, preferably by default (though non-limiting), display screen 240 can provide information about the area's current security status, location code, security messages and/or instructions, and a mix of optional aesthetic or communicative assets such as time, date, weather, room schedules, school logo, etc. However, the information displayed on screen 240 while in standby mode or during non-emergency events/situations is not considered limited to any specific type of information, images, text, video, audio, etc. and all various content capable of being digitally displayed on screen 240 can be considered included and within the scope of the disclosure. Preferably, screen 240 can be accessible and visible through opening 116 of front member 102.

A plurality of LED lights 141 can be provided to preferably indicate a current status for certain components features of Cover 100 and can protrude through openings 119 in front member 102. In a preferred, but non-limiting, embodiment, LED lights can be provided to indicate the status of a camera 411, audio, silent alarm, and back up battery 193. In default mode, preferably all lights 141 of Cover 100 can be "off" which can indicate that none of the functions represented by lights 141 are currently active or being utilized. Thus, in a preferred "default" state, the system/microcontroller 320 can be configured such that camera 411 is not active and audio is not being broadcasted by Cover 100. Preferably, the conventional use of existing light switches 50 are not controlled or impacted by the presence or electronics of Cover 100. Accordingly, the Cover 100 has the dual/combined purposes of serving as a light switch cover and as a communication/notification system, the operation of light switches 50 and the use of Cover 100 in lieu of a conventional light switch cover can be preferably separate and independent of the use of Cover 100 as a communication/notification system.

Lockdown button/lever 151 can be preferably covered by cover 153 (which can be preferably transparent) to prevent accidental trigger through inadvertent pressing or pulling on button/lever 151.

In non-emergency and/or general assistance scenarios a call button 161 can be provided and can connect users with a system operator or monitor. When button 161 is pressed, an assigned audio transmission light, such as, but not limited to one of the LED lights 141, can be powered and light up/illuminate to indicate to the user that they can begin to communicate their purpose for contact to the remote person in communication with Cover 100. Preferably, a microphone 413 can be provided as part of the components for the communication portion of Cover 100. The message can be recorded, converted to text and queued to be addressed or otherwise responded to by the operator. Though not limiting, the call button 161 feature can be preferably for internal communication (i.e. similar to an intercom) and handled by on-site members of the organization, but preferably who are not physically present in the same room as where the specific Cover 100 is located. Preferably, the operator or monitor can be provided with the ability to initiate two-way, live communication, escalate the issue, connect the user with another unit, or resolve the issue and close the connection. Once resolved, recording/listening stops and the audio assigned LED 141 can be turned off.

Where an emergency or other event requiring assistance is occurring, Cover 100 can be manually triggered for an emergency situation (i.e. lockdown, sending location information, etc.) through the activation of emergency lever/button 151 or through remote activation from a command system that is in wired and/or wireless communication with Cover 100. Remote activation can be performed for individual Cover 100 units, Cover 100 units in a specified area, or all Cover 100 units in the facility/building/campus, etc. An audio message or tone can play over a speaker 145 of Cover 100 (which can be covered by a speaker grill 147) and microcontroller 320 can cause screen display 240 to change color to a color associated with the type of the security risk, a title classifying the event type, and written instructions to direct the occupants located with Cover 100 in how to respond. As non-limiting examples, this feature can be utilized for inclement weather, security threats, lockdown events, natural disasters (e.g. earthquakes), fire, evacuation, etc.

Cover 100 can also be provided with voice recognition capabilities and can be configured to activate actions through receipt of a keyword. Microcontroller 320 of Cover 100 can be programmed or configured to recognize preset words that indicate an event, such as, but not limited to, when such keyword is spoken and near or next to Cover 100 and picked up through microphone 413. Non-limiting examples of keywords can include, without limitation "help", "intruder", "gun", "fight", etc. can be programmed by the receiving organization or can be default options. Other words or short phrases can also be used and all are considered within the scope of the disclosure.

When an event triggering keyword or short phrase heard or determined by microcontroller 320, both audio and video connections can be broadcasted to the monitor/operator. Lights and/or LED lights 141 for video and audio can be illuminated to indicate that the feature is being utilized. The monitor/operator can begin a 2-way communication to further assess the situation, contact the appropriate emergency services, and provide instruction for handling the situation and updates. Based on the threat level, the operator/monitor can trigger surrounding or all other Cover 100 units and provide response instructions. Once resolved, the operator closes the issue, preferably causing all of the activated Cover 100 unites to return to their default mode.

As noted above, a lockdown event can be triggered through pulling or pushing on lever/button 151. To access lever/button 151 security cover 153 preferably can be lifted to allow lever/button 151 to be operated. Preferably, lockdown button/lever can remain depressed/pulled to indicate that button/lever 151 has been pressed/pulled far enough to engage the lockdown protocol. Microcontroller 320 can be configured to automatically initiate broadcasting of video and audio to the operator/monitor, and their associated lights and/or LED lights 131 can be illuminated to indicate that use to the user (i.e. that Cover 100 is currently transmitted audio and video). Preferably, all Cover 100 devices associated with the building/facility can be automatically triggered, producing an audio tone and displaying a red lockdown screen on their screen 240 with instructions that align with the organization's response policy. Police and local emergency services can also be automatically alerted. Two-way audio communication can be immediately or virtually immediately established between the triggering Cover 100 and an operator to gather more information and to pinpoint the location within the building/facility where the emergency situation was initiated. This interaction with the operator can be recorded, converted to text and available to authorities in real time. Cover 100 units can be addressed individually, by zone, or facility wide to communicate instructions via audio through speaker 145, display screen 240 or both. Once the event is resolved, the operator can close the event, which can cause resetting of the Cover 100 units to their default status and authorities or responsible personal internal to the organization (i.e. located at the facility, building, campus, etc.) can reset the triggered units' lockdown button/lever 151 and preferably transparent cover 153. All recorded messages and/or video/audio of an emergency event can be stored in memory 322.

In the event of a power outage or natural disaster, Cover 100 can still be operable by switching to a backup power source mode which preferably can be a backup battery 193. Preferably, battery 193 can be charged after use through the wired powering of Cover 100 during normal conditions. When battery 193 is being used as the power source for Cover 100, An assigned LED light 141 can be illuminated to indicate that Cover 100 is currently being powered by the backup power source. During such power outage/natural disaster scenario, instructions can be displayed on screen and appropriate response measures can be displayed on screen 240.

FIGS. 6 through 8 illustrate using Power over Ethernet ("POE") from a conduit 600, such as, but not limited to, CAT 5 wiring/cable. As a non-limiting example, a ½" (other dimensions can also be used) conduit 600 can be mounted to a wall 640 that can enter a top 190 of Cover 100 Communicator housing via a knockout 192. Conduit 600 can cover wiring from alert or emergency systems outside of the communication products specifically associated with Cover 100 (such as, but not limited to, the above-identified Remote Incident Communicator line of products) that receives power over ethernet (POE). Knockout 192 allows Cover 100 to adapt to retrofit systems where CAT5 cables are not built into the existing infrastructure. The CAT5 wiring from the outside system can be fed into the Cover 100 Communicator housing through knockout 192 and connected to a CAT 5 port on the main printed circuit board ("PCB"). This can allow Cover 100 to integrate with other systems and provide power and data connection through the CAT5 port.

Figure 9:
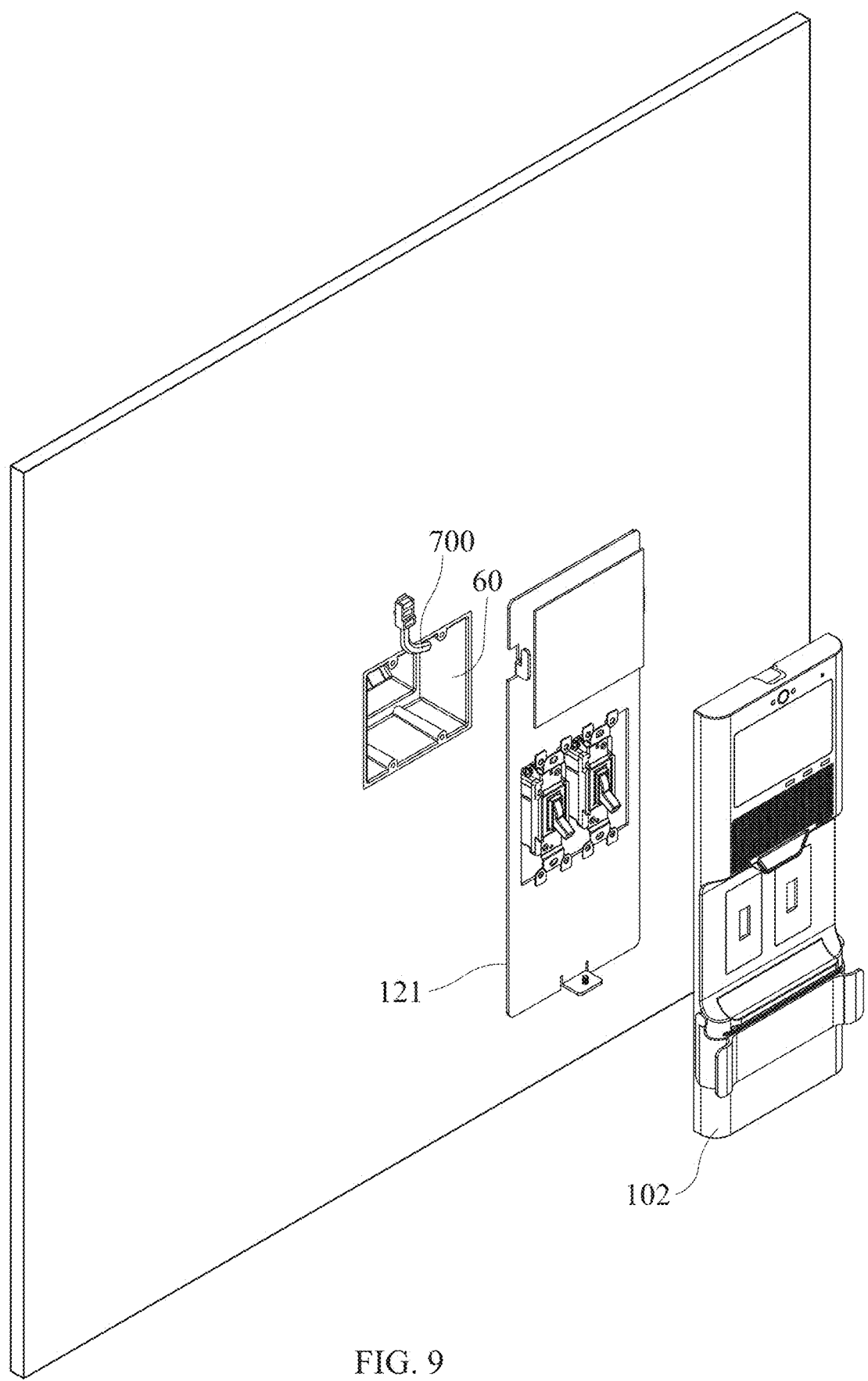
FIG. 9 is an exploded top perspective view of the cover/communicator with POE capabilities from within a wall of building.
Figure 10:
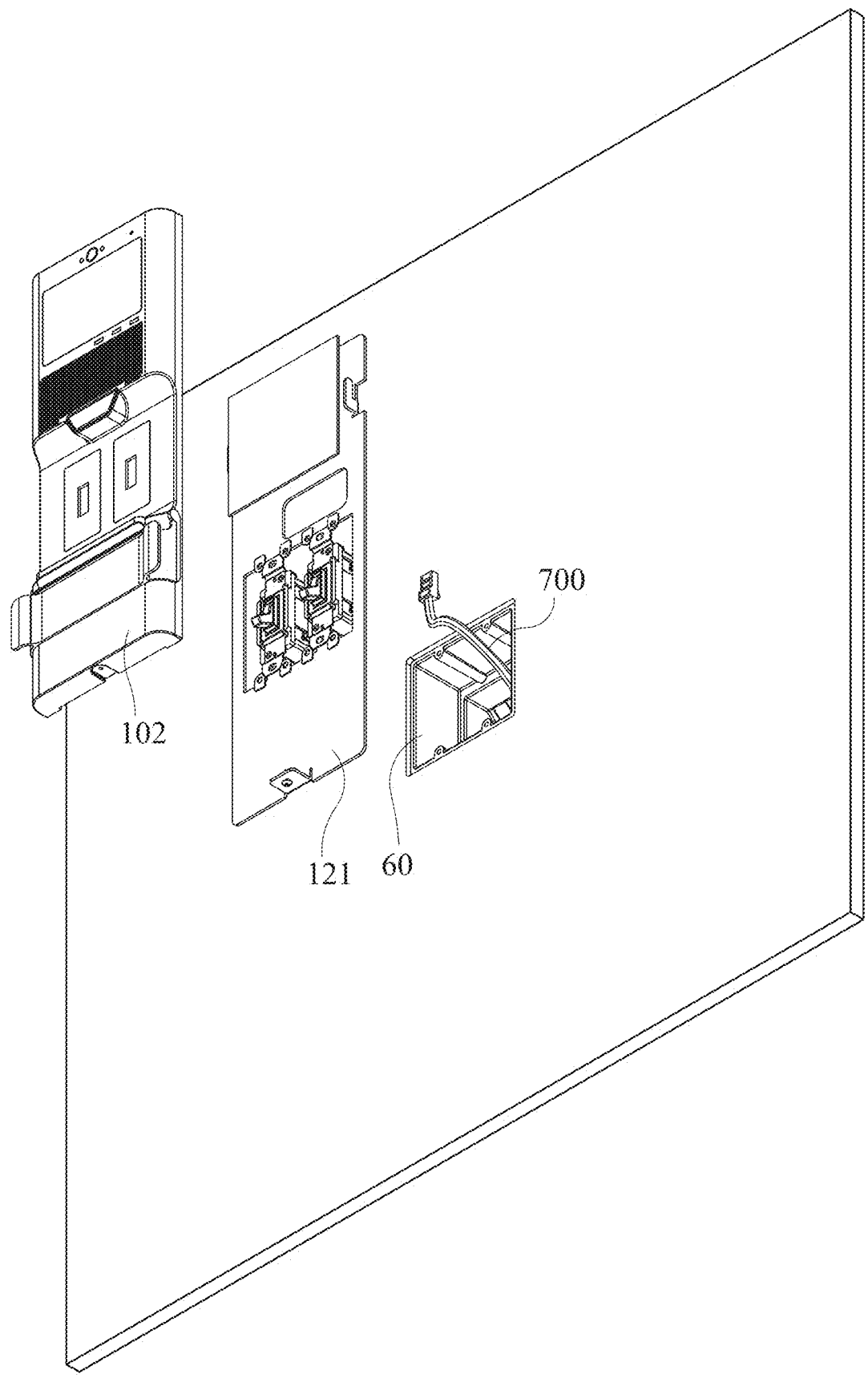
FIG. 10 is an exploded bottom perspective view of the cover/communicator with POE capabilities of FIG. 9.

FIGS. 9 and 10 illustrate using POE from a wall. In this embodiment, CAT5 wiring 700 can exit dual gang light switch box 60 where Cover 100 is mounted and CAT 5 wiring 700 can be used for the same purpose as CAT 5 wiring 600 described above. CAT5 wire 700 can be fed into the housing and can connect to the CAT5 connector on the main PCB board.

FIG. 11 illustrates an embodiment for power to Cover 100. This non-liming embodiment illustrates splitting power from an existing wall power to a single light switch in a dual gang box to power Cover 100. Wires from the existing wall power can be removed from the light switch and a split can be added. One side of the split can be reconnected to the existing light switch. The other side of the split can lead to the appropriate connector for connection with AC to DC converter 406 that supplies Cover 100 with the appropriate voltage. Wire nuts are shown and provided for joining the wall power to the light switch wiring and AC to DC converter connector.

FIG. 13 illustrates a preferred non-limiting hardware embodiment 400 illustrating the major components for the system that provides the various electronic functions for the novel cover. As seen, a power subsection ("AC Wall Power" 402) can be provided that can be preferably fed from a standard 110/220 VAC light switch wiring to receive electrical power. An AC/DC converter 406 can be provided to convert the existing 110/220 VAC coming from the wall (i.e. AC wall power 402) or Power Over Ethernet or other location to DC power and can also preferably provide for several standard electrical safety isolation features. A DC Power supply 408 can be provided and can clean and condition the DC power converted by AC/DC converter 406. In the event of an AC power outage, the system DC power can be sustained and supplied from a preferably provided Battery backup 193, which in one non-limiting embodiment can be a LiPo battery. Other types of battery backups can be used and are considered within the scope of the disclosure.

A primary controller of the various functions of the cover/electronic system can be a System Microcontroller 320. In one non-limiting embodiment, system controller 320 can be a STM32 or ESP32 or the like microcontroller, capable of driving each of the peripheral features. Other microcontrollers having similar capabilities and/or characteristics can also be used or provided and are considered within the scope of the disclosure. A programming and debugging interface can be primarily provided via the USB or Serial UART connections 416 and 418, respectively. Preferably, neither of these connections are typically accessible to the outside user for security reasons. A Memory 320 can be provided for holding the firmware code that is run on System Microcontroller 320 as well as non-volatile configuration information. In one non-limiting embodiment, memory 320 can be on-board flash, EEPROM, external Flash, Micro-SD card or the like and other memory types can also be used and are considered within the scope of the disclosure.

Wireless communications interfaces can include WiFi (802.11 b/g/n or the like) 426 and Bluetooth (Bluetooth 4.1 or BLE 5.0 or the like) 428. The system is not considered limited to any particular wireless communication technology, and other wireless communication technologies now known or later developed can also be used and considered within the scope of the disclosure. Though not limiting, the system networking interface can be preferably primarily through WiFi connection 426. WiFi 426 can sometimes be set up in Access Point mode for direct connection and system configuration such as assigning network SSID and password. Bluetooth communications interface 428 can be used in the system preferably as a Broadcast Beacon, which can broadcast the system's MAC address or other identification/status information of the system. Other mobile electronic/electrical components, which communicate with the novel Cover 100 and also provide novel security communication abilities, can be provided and may listen for broadcasts from multiple sources/locations of this system to triangulate position or determine nearest fixed position.

Though not limiting, a primary user interface for novel Cover can be via an LCD display 240 which can be provided with optional touchscreen capabilities. Other types of digital displays can also be used and considered within the scope of the disclosure. When Cover 100 is used in a school scenario, information such as room number/teacher name/school logo/time of day/date and the like can be displayed under "normal" non-emergency status on display 240. Under emergency status, alarm status information/generic instructions/customized instructions can be displayed on display 240. Some information can be pre-configured, such as generic instructions, teacher name, room number and the like. Other information can be automatically generated from access to the network such as time of day, date, weather and the like. Other information can be displayed based on instructions from a central control system, such as alert status, and customized instructions.

The user may also communicate with the system via a Panic switch (i.e. emergency lever/button 151). The Panic switch can be a relatively large button or easy to find button preferably located on front member 102 of Cover 100 or slide pull-down switch/lever on front member 102 of Cover 100 (similar to a fire alarm pull). Preferably, Panic switch 151 can be located/configured such that it is generally not immediately accessible to the user or can be normally covered by a cover 153, in order to reduce tampering or false alarms. Panic switch 151 may be covered or secured in a way that requires one action to be taken prior to access or operation of Panic switch 151. For example, cover 153 may be needed to be flipped open to expose panic switch 151 or other mechanical means of securing Panic switch 151 may be embodied and incorporated into Cover 100 to help reduce tampering and false alarms.

The user may also communicate with the system via a Speaker 145 and Microphone 413. System microcontroller 320, in one non-limiting example, may be triggered by a predetermined "wake word" heard or determined by microcontroller 320 through microphone 413 to cause an alarm trigger or other action. The System may make announcements through speaker 145. Microphone 413 and Speaker 145 may be used in conjunction with a network connection to create verbal communication between the System and another on the network or internet. An optional camera 411 can be provided with Cover 100 and can facilitate verbal communication or can be used to transmit live broadcast of video.

Other General-Purpose Input/Output (GPIO) lines 407 can also be provided and can be used for other expansion features. Several GPIO outputs can be used to drive indicator or status LEDs 141 such as power status, silent alarm status, notification indication, system errors or the like can be provided with at least some of the status LEDs visible to an individual looking at the cover secured/mounted as light switch cover/communicator. Accordingly, several LEDs can be provided and can represent different features provided by the novel light cover switch such as, without limitation, that the provided camera is currently active, that the cover is currently powered by the backup battery, etc. The LEDs provided on the novel cover are not limited to any particular number and can also be used to indicate other features in addition to those shown or in replace thereof.

One or more, and preferably a plurality of General Purpose Input/Output ("GPIO") connections 407 can also be provided and used for an user interface when a touchscreen 240 feature is absent (not provided for Cover 100) or as a backup in case the provided touchscreen 240 is not working properly, and the GPIO inputs can be used for resetting the system or the like.

Accordingly, for use and installing Cover 100, preferably Cover 100 can be retrofitted with existing wiring at the wall or surface where it is to be preferably mounted/installed and preferably no new wiring is needed to be installed.

Cover 100 can provide built-in intercom features. In a school scenario, with Cover 100 units in various classrooms, administrative offices, other rooms in the school, teachers and administrators do not need to carry radios (i.e., 2-way radios, etc.) or other devices to alert in emergency situations, as Cover 100 can be used for such purposes.

Preferably Cover 100 can provide multiple ways to lockdown a school or other location equipped with Cover 100 unit(s), which can include a custom wake word/phrase to cause microcontroller to initiate the lockdown, pressing a lockdown option displayed on the touch screen display 240 (which can always be present or can appear when one or more of the buttons/levers of Cover 100 is pressed/pulled or a custom word/phrase is verbally pronounced by the user), and/or activating the lockdown lever/button 151. Microcontroller 320 can be configured to directly control itself the initiating of a lockdown procedure at the location using one or more of the above-described actions by the user, and/or microcontroller 320 can be configured to alert a monitoring system/personnel (preferably also at the location or at a remote location) of the emergency situation upon one of the above-described user actions and the monitoring system can be responsible for initiating the lockdown procedure at the location.

Preferably, with a Cover 100 mounted in most, if not every/all room/rooms and interior spaces; the multiple Cover 100 units/switches locations within the building/facility can electronically map out the building/facility such that it exactly or virtually exactly matches a critical response map to pinpoint the location of any event.

Cover 100 can preferably communicate with the above-mentioned Remote Incident Communicator that may be on the person of the user (i.e., in the user's possession) for remote control mobile actuation of Cover 100.

School colors, business logos, images, artwork, etc. can be displayed on screen 240 (i.e. preferably in normal non-emergency situations) and/or be other provided on at least some parts of the outer surface of Cover 100.

Preferably, Cover 100 is fixed/stationary with respect to the wall/surface it is mounted to and preferably is not a removable device, nor a docking station for another portable device.

Cover 100 can also serve as an original power source to other IoT devices without the need for electrical wire home runs to a breaker panel in the building/facility and without the need for transformers to step the electrical current down.

Features described for one embodiment are also considered to be available and/or used in other described and/or shown embodiment for the novel light switch cover communicator and thus the features, uses, components, etc. for all other embodiments are incorporated by reference for each embodiment.

It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments may have been described with reference to the figure or figures, it is understood that various changes in form and details may be made therein without departing from their spirit and scope and such changes are considered within the scope of the disclosure.

All parts/components of the novel light switch cover communicator and their locations, wiring, powering means, charging means, wireless communication means and technology; recording means, storage means, broadcasting means, mechanical and/or electrical communications between parts/components and/or devices, attachment or securement mechanisms, dimensions, values, ratings, shapes, colors, materials, etc. discussed above or shown in the figures, if any, are merely by way of example and are not considered limiting and other component(s) and their locations, wiring, powering means, charging means, wireless communication means and technology, recording means, storage means, broadcasting means, mechanical and/or electrical communications between parts/components and/or devices, attachment or securement mechanisms, dimensions, values, ratings, shapes, colors materials, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

While the novel light switch cover communicator has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A combination outlet or light switch cover and communication system adapted for securement to an existing electrical box in place of a conventional light switch or outlet cover, comprising, a body member adapted for securement to an existing electrical box, the body member having an opening for accessing and using one or more existing light switches or outlets associated with the existing electrical box; and an electronic communication system at least partially housed within the body member, wherein when mounted to the existing electrical box the communication is adapted to be electrically powered through connection with the existing wiring associated with electrical box, the electronic communication system including a button or lever that upon activation by a user through pressing the button or pulling the lever causes a system microcontroller of the electronic communication system to initiate communication with another communication system remotely located from a location where the body member is mounted to the existing electrical box;

wherein the communication system includes an externally visible electronic display or screen adapted for displaying instructions for individuals located at or near to the location where the body member is mounted to the existing electrical box when the button or lever is activated by the user for an emergency situation.

2. The combination outlet or light switch cover and communication system of claim 1 wherein the instructions are electronically received by the electronic communication system from the another communication system upon the another communication being digitally informed of the emergency situation through the activation of the button or lever by the user.

3. The combination outlet or light switch cover and communication system of claim 1 wherein the system controller displaying logos, colors, images or other visual or textual information not related to an emergency situation on the display or screen when the button or lever has not been activated.

4. The combination outlet or light switch cover and communication system of claim 1 wherein the communication system further comprising an AC to DC Power converter for converting AC power receiving from the existing wiring at the existing electrical box to DC power.

5. The combination outlet or light switch cover and communication system of claim 1 wherein the communication system further comprising a battery backup for powering the communication system where there is a power outage affecting the availability of receiving AC power from the existing wiring at the existing electrical box.

6. The combination outlet or light switch cover and communication system of claim 1 wherein the communication system further including a microphone and speaker to permit verbal communication with the remotely located another communication system.

7. The combination outlet or light switch cover and communication system of 1 further comprising a removable or movable activation switch cover externally secured to the body member to help reduce inadvertent or accidental activation of the button or lever.

8. A combination outlet or light switch cover and communication system adapted for securement to an existing electrical box in place of a conventional light switch or outlet cover, comprising, a body member adapted for securement to an existing electrical box, the body member having an opening for accessing and using one or more existing light switches or outlets associated with the existing electrical box; and an electronic communication system at least partially housed within the body member, wherein when mounted to the existing electrical box the communication is adapted to be electrically powered through connection with the existing wiring associated with electrical box, the electronic communication system including a button or lever that upon activation by a user through pressing the button or pulling the lever causes a system microcontroller of the electronic communication system to initiate communication with another communication system remotely located from a location where the body member is mounted to the existing electrical box;

wherein the system microcontroller configured to automatically initiate or send lockdown commands or instructions upon activation of the button or lever by the user concerning lockdown of a room where the communication system is located, the building or facility where the communication system is located or an area associated with a location of the communication system.

9. The combination outlet or light switch cover and communication system of 1 wherein the system microcontroller configured to automatically send digital information concerning a location of the communication system to one or more first responders or emergency centers or agencies upon activation of the button or lever by the user for an emergency event.

10. The combination outlet or light switch cover and communication system of claim 9 wherein the digital information includes an exact room location within a building or facility when the communication system is located within a multiple room or multiple story building or facility.

11. The combination outlet or light switch cover and communication system of claim 8 wherein the communication system further comprising an AC to DC Power converter for converting AC power receiving from the existing wiring at the existing electrical box to DC power.

12. The combination outlet or light switch cover and communication system of claim 8 wherein the communication system further comprising a battery backup for powering the communication system where there is a power outage affecting the availability of receiving AC power from the existing wiring at the existing electrical box.

13. The combination outlet or light switch cover and communication system of claim 8 wherein the communication system further including a microphone and speaker to permit verbal communication with the remotely located another communication system.

14. The combination outlet or light switch cover and communication system of 8 further comprising a removable or movable activation switch cover externally secured to the body member to help reduce inadvertent or accidental activation of the button or lever.

15. The combination outlet or light switch cover and communication system of 8 wherein the system microcontroller configured to automatically send digital information concerning a location of the communication system to one or more first responders or emergency centers or agencies upon activation of the button or lever by the user for an emergency event.

16. The combination outlet or light switch cover and communication system of claim 15 wherein the digital information includes an exact room location within a building or facility when the communication system is located within a multiple room or multiple story building or facility.

17. The combination outlet or light switch cover and communication system of claim 8 wherein the communication system includes an externally visible electronic display or screen adapted for displaying instructions for individuals located at or near to the location where the body member is mounted to the existing electrical box when the button or lever is activated by the user for an emergency situation.

18. The combination outlet or light switch cover and communication system of claim 17 wherein the instructions are electronically received by the electronic communication system from the another communication system upon the another communication being digitally informed of the emergency situation through the activation of the button or lever by the user.

19. The combination outlet or light switch cover and communication system of claim 18 wherein the system controller displaying logos, colors, images or other visual or textual information not related to an emergency situation on the display or screen when the button or lever has not been activated.

* * * * *